United States Patent
Su et al.

(10) Patent No.: US 11,829,644 B2
(45) Date of Patent: Nov. 28, 2023

(54) MEMORY CONTROL METHOD, MEMORY STORAGE DEVICE, AND MEMORY CONTROL CIRCUIT UNIT

(71) Applicant: PHISON ELECTRONICS CORP., Miaoli (TW)

(72) Inventors: Po-Cheng Su, Hsinchu (TW); Chih-Wei Wang, Tainan (TW); Yu-Cheng Hsu, Yilan County (TW); Wei Lin, Taipei (TW)

(73) Assignee: PHISON ELECTRONICS CORP., Miaoli (TW)

( * ) Notice: Subject to any disclaimer, the term of this patent is extended or adjusted under 35 U.S.C. 154(b) by 6 days.

(21) Appl. No.: 17/581,858

(22) Filed: Jan. 22, 2022

(65) Prior Publication Data
US 2023/0176783 A1 Jun. 8, 2023

(30) Foreign Application Priority Data
Dec. 8, 2021 (TW) .................. 110145959

(51) Int. Cl.
*G06F 12/00* (2006.01)
*G06F 3/06* (2006.01)

(52) U.S. Cl.
CPC .......... *G06F 3/0659* (2013.01); *G06F 3/0619* (2013.01); *G06F 3/0679* (2013.01)

(58) Field of Classification Search
None
See application file for complete search history.

(56) References Cited

U.S. PATENT DOCUMENTS

| 2010/0124115 | A1* | 5/2010 | Ha | G11C 16/24 |
| | | | | 365/185.11 |
| 2018/0358103 | A1* | 12/2018 | Shur | G11C 16/08 |

* cited by examiner

*Primary Examiner* — Daniel D Tsui
(74) *Attorney, Agent, or Firm* — JCIPRNET

(57) ABSTRACT

A memory control method, a memory storage device, and a memory control circuit unit are provided. The memory control method includes: receiving a read command from a host system; in response to a first physical erasing unit being a first type physical unit, sending a first operation command sequence to instruct a rewritable non-volatile memory module to read a first physical programming unit based on a first electronic configuration; and in response to the first physical erasing unit being a second type physical unit, sending a second operation command sequence to instruct the rewritable non-volatile memory module to read the first physical programming unit based on a second electronic configuration. The first electronic configuration is different from the second electronic configuration.

30 Claims, 8 Drawing Sheets

MEMORY CONTROL METHOD, MEMORY STORAGE DEVICE, AND MEMORY CONTROL CIRCUIT UNIT

CROSS-REFERENCE TO RELATED APPLICATION

This application claims the priority benefit of Taiwan application serial no. 110145959, filed on Dec. 8, 2021. The entirety of the above-mentioned patent application is hereby incorporated by reference herein and made a part of this specification.

BACKGROUND

Technical Field

The disclosure relates to a memory control technology, and particularly relates to a memory control method, a memory storage device, and a memory control circuit unit.

Description of Related Art

Digital cameras, mobile phones, and MP3 players have grown rapidly in recent years, which has led to a rapid increase in consumer demand for storage media. As the rewritable non-volatile memory module (for example, a flash memory) has characteristics such as non-volatile data, power saving, small size, and no mechanical structure, the rewritable non-volatile memory module is very suitable for being built into the various portable electronic devices exemplified above.

Memory cells in the rewritable non-volatile memory module achieve the objective of storing data by injecting charge into the memory cells. When reading data, a read voltage may be applied to a specific memory cell to read data stored in the memory cell. However, in practice, depending on whether a physical block is an open block (that is, a block that has not been fully written) or a closed block (that is, a block that has been fully written), reading errors that occur when data is read from the physical block are not the same, such that the difficulty in subsequent correction of the read data is increased.

SUMMARY

The disclosure provides a memory control method, a memory storage device, and a memory control circuit unit, which can improve accuracy of reading data.

An exemplary embodiment of the disclosure provides a memory control method, which is used in a rewritable non-volatile memory module. The rewritable non-volatile memory module includes multiple physical erasing units. The memory control method includes the following steps. A read command is received from a host system. The read command instructs to read a first logical unit. The first logical unit is mapped to a first physical programming unit. The first physical programming unit belongs to a first physical erasing unit among the physical erasing units. In response to the first physical erasing unit being a first type physical unit, a first operation command sequence is sent to instruct the rewritable non-volatile memory module to read the first physical programming unit based on a first electronic configuration. In response to the first physical erasing unit being a second type physical unit, a second operation command sequence is sent to instruct the rewritable non-volatile memory module to read the first physical programming unit based on a second electronic configuration. The first electronic configuration is different from the second electronic configuration. A first total number of physical programming units in an erased status in the first type physical unit is different from a second total number of physical programming units in the erased status in the second type physical unit.

An exemplary embodiment of the disclosure further provides a memory storage device, which includes a connection interface unit, a rewritable non-volatile memory module, and a memory control circuit unit. The connection interface unit is used to couple to a host system. The rewritable non-volatile memory module includes multiple physical erasing units. The memory control circuit unit is coupled to the connection interface unit and the rewritable non-volatile memory module. The memory control circuit unit is used to perform the following. A read command is received from the host system. The read command instructs to read a first logical unit. The first logical unit is mapped to a first physical programming unit. The first physical programming unit belongs to a first physical erasing unit among the physical erasing units. In response to the first physical erasing unit being a first type physical unit, a first operation command sequence is sent to instruct the rewritable non-volatile memory module to read the first physical programming unit based on a first electronic configuration. In response to the first physical erasing unit being a second type physical unit, a second operation command sequence is sent to instruct the rewritable non-volatile memory module to read the first physical programming unit based on a second electronic configuration. The first electronic configuration is different from the second electronic configuration. A first total number of physical programming units in an erased status in the first type physical unit is different from a second total number of physical programming units in the erased status in the second type physical unit.

An exemplary embodiment of the disclosure further provides a memory control circuit unit, which is used to control a rewritable non-volatile memory module. The rewritable non-volatile memory module includes multiple physical erasing units. The memory control circuit unit includes a host interface, a memory interface, and a memory management circuit. The host interface is used to couple to a host system. The memory interface is used to couple to the rewritable non-volatile memory module. The memory management circuit is coupled to the host interface and the memory interface. The memory management circuit is used to perform the following. A read command is received from the host system. The read command instructs to read a first logical unit. The first logical unit is mapped to a first physical programming unit. The first physical programming unit belongs to a first physical erasing unit among the physical erasing units. In response to the first physical erasing unit being a first type physical unit, a first operation command sequence is sent to instruct the rewritable non-volatile memory module to read the first physical programming unit based on a first electronic configuration. In response to the first physical erasing unit being a second type physical unit, a second operation command sequence is sent to instruct the rewritable non-volatile memory module to read the first physical programming unit based on a second electronic configuration. The first electronic configuration is different from the second electronic configuration. A first total number of physical programming units in an erased status in the first type physical unit is different from a second total number of physical programming units in the erased status in the second type physical unit.

Based on the above, after receiving the read command from the host system, according to the type of the first physical erasing unit to which the first physical programming unit to be read belongs, the sent operation command sequence may instruct the rewritable non-volatile memory module to read the first physical programming unit based on different electronic configurations. In particular, the total numbers of the physical programming units in the erased status in different types of the physical erasing units are different. In this way, accuracy of reading data can be effectively improved.

DETAILED DESCRIPTION OF DISCLOSED EMBODIMENTS

Generally speaking, a memory storage device (also referred to as a memory storage system) includes a rewritable non-volatile memory module and a controller (also referred to as a control circuit). The memory storage device may be used together with a host system, so that the host system may write data to the memory storage device or read data from the memory storage device.

Figure 1:
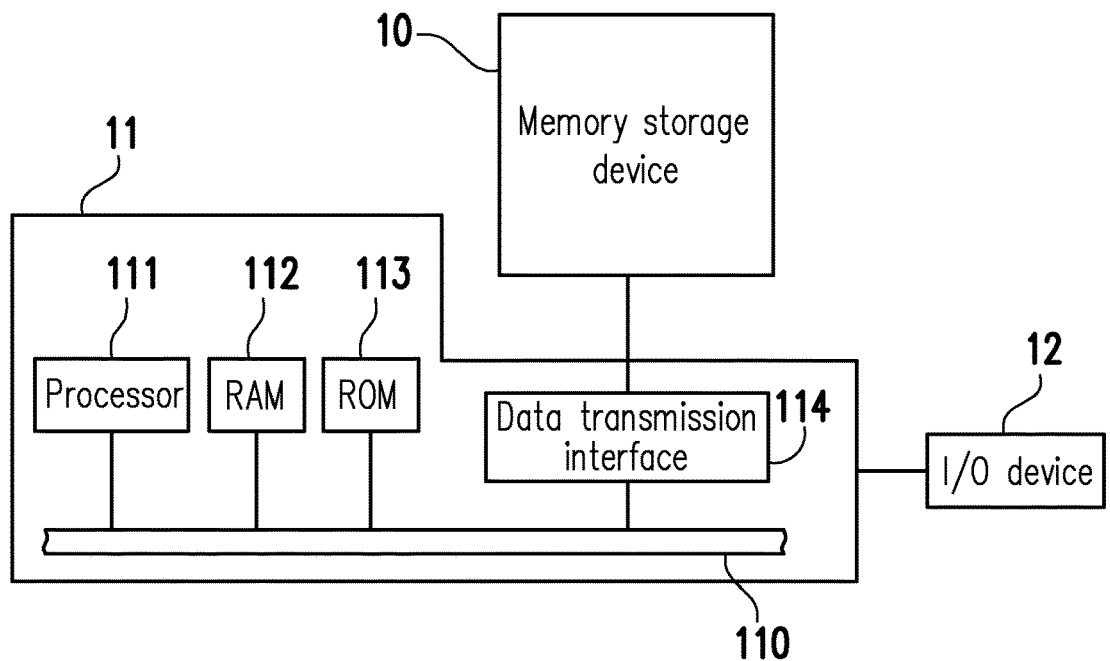
FIG. 1 is a schematic diagram of a host system, a memory storage device, and an input/output (I/O) device according to an exemplary embodiment of the disclosure.
Figure 2:
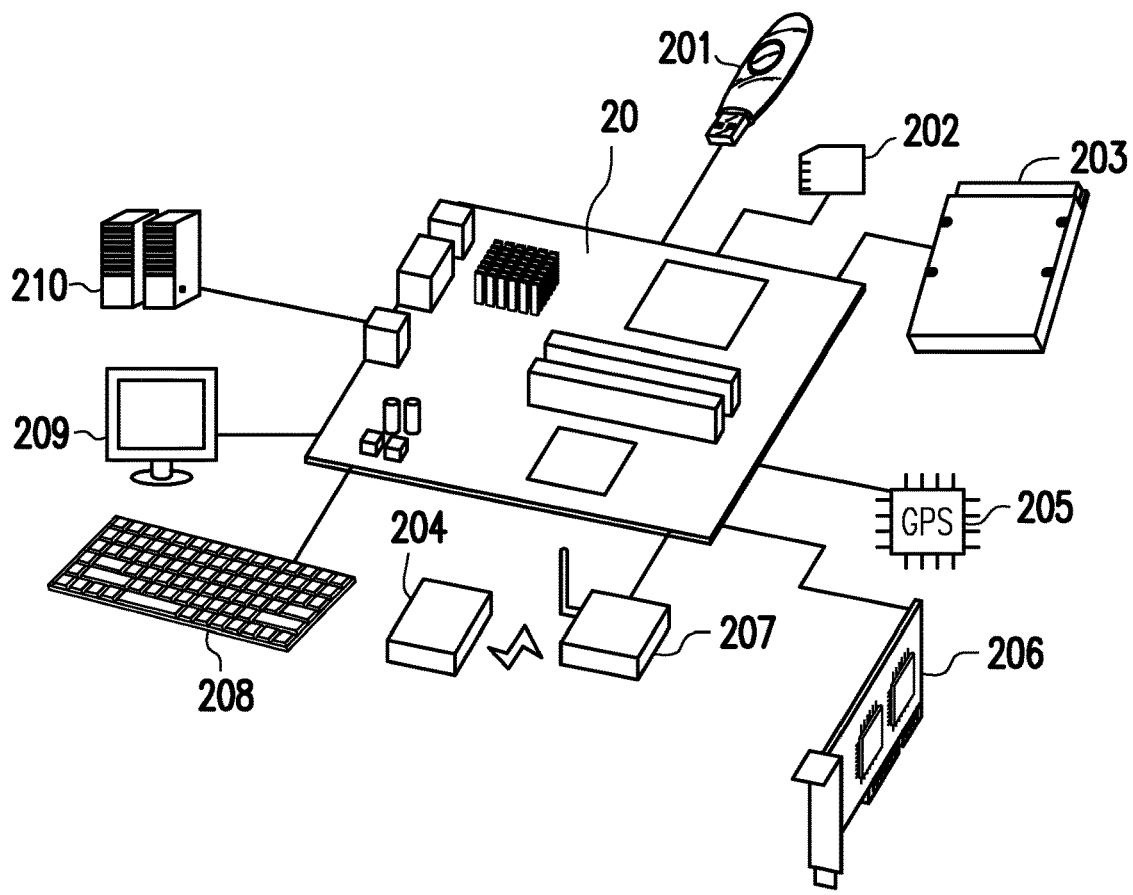
FIG. 2 is a schematic diagram of a host system, a memory storage device, and an I/O device according to an exemplary embodiment of the disclosure.

FIG. 1 is a schematic diagram of a host system, a memory storage device, and an input/output (I/O) device according to an exemplary embodiment of the disclosure. FIG. 2 is a schematic diagram of a host system, a memory storage device, and an I/O device according to an exemplary embodiment of the disclosure.

Please refer to FIG. 1 and FIG. 2. A host system 11 may include a processor 111, a random access memory (RAM) 112, a read only memory (ROM) 113, and a data transmission interface 114. The processor 111, the random access memory 112, the read only memory 113, and the data transmission interface 114 may be coupled to a system bus 110.

In an exemplary embodiment, the host system 11 is coupled to the memory storage device 10 through the data transmission interface 114. For example, the host system 11 may store data to the memory storage device 10 or read data from the memory storage device 10 via the data transmission interface 114. In addition, the host system 11 may be coupled to the I/O device 12 through the system bus 110. For example, the host system 11 may send an output signal to the I/O device 12 or receive an input signal from the I/O device 12 via the system bus 110.

In an exemplary embodiment, the processor 111, the random access memory 112, the read only memory 113, and the data transmission interface 114 may be disposed on a motherboard 20 of the host system 11. The number of the data transmission interface 114 may be one or more. Through the data transmission interface 114, the motherboard 20 may be coupled to the memory storage device 10 via a wired or wireless manner.

In an exemplary embodiment, the memory storage device 10 may be, for example, a flash drive 201, a memory card 202, a solid state drive (SSD) 203, or a wireless memory storage device 204. The wireless memory storage device 204 may be, for example, a near field communication (NFC) memory storage device, a Wi-Fi memory storage device, a Bluetooth memory storage device, a low-power Bluetooth memory storage device (for example, iBeacon), or other memory storage devices based on various wireless communication technologies. In addition, the motherboard 20 may also be coupled to a global positioning system (GPS) module 205, a network interface card 206, a wireless transmission device 207, a keyboard 208, a screen 209, a speaker 210, or various other I/O devices through the system bus 110. For example, in an exemplary embodiment, the motherboard 20 may access the wireless memory storage device 204 through the wireless transmission device 207.

In an exemplary embodiment, the host system 11 is a computer system. In an exemplary embodiment, the host system 11 may be any system that may substantially cooperate with a memory storage device to store data. In an exemplary embodiment, the memory storage device 10 and the host system 11 may respectively include a memory storage device 30 and a host system 31 of FIG. 3.

Figure 3:
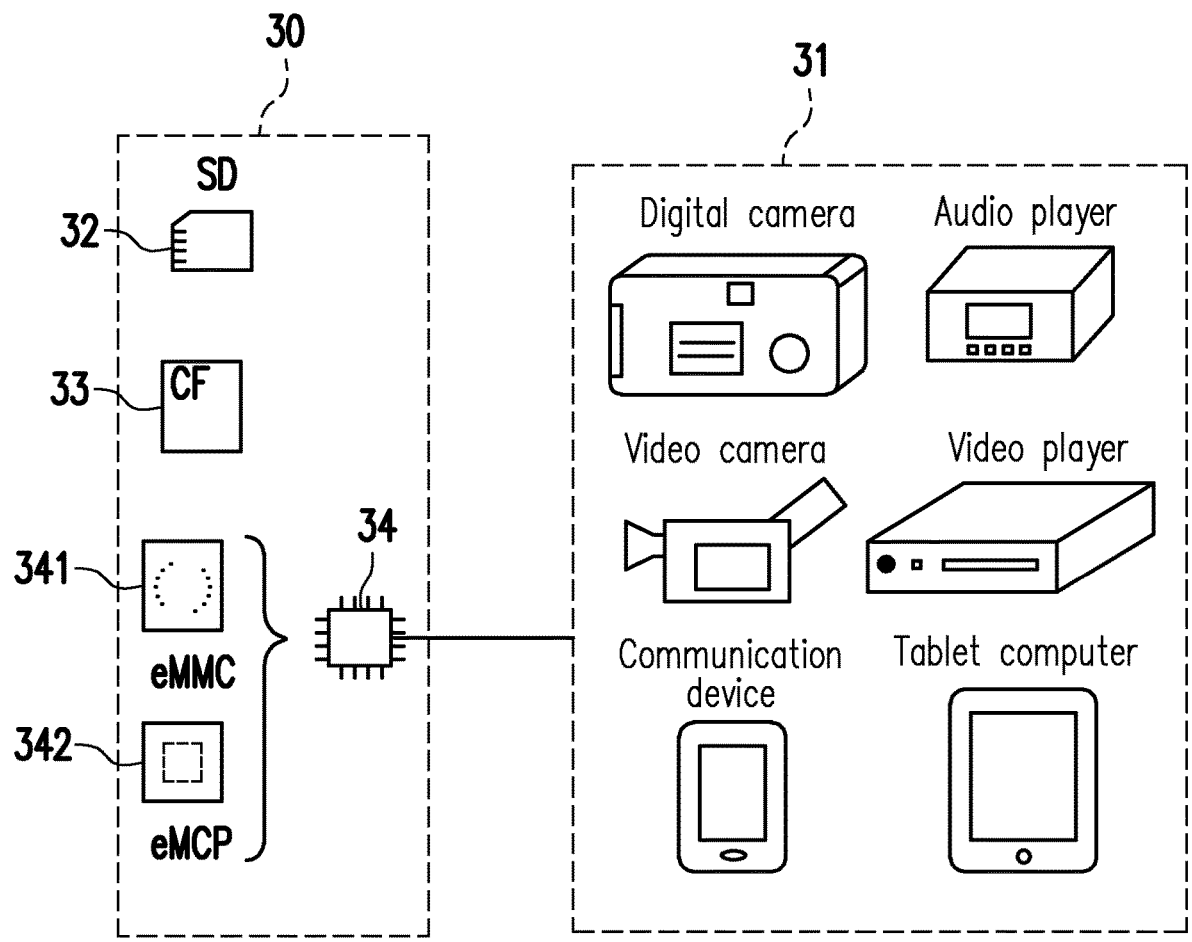
FIG. 3 is a schematic diagram of a host system and a memory storage device according to an exemplary embodiment of the disclosure.

FIG. 3 is a schematic diagram of a host system and a memory storage device according to an exemplary embodiment of the disclosure. Please refer to FIG. 3. The memory storage device 30 may be used in conjunction with the host system 31 to store data. For example, the host system 31 may be a digital camera, a video camera, a communication device, an audio player, a video player, a tablet computer, or other systems. For example, the memory storage device 30 may be a secure digital (SD) card 32, a compact flash (CF) card 33, an embedded storage device 34, or various other non-volatile memory storage devices used by the host system 31. The embedded storage device 34 includes an embedded multi media card (eMMC) 341, an embedded multi chip package (eMCP) storage device 342, and/or various other embedded storage devices in which a memory module is directly coupled onto a substrate of a host system.

Figure 4A:
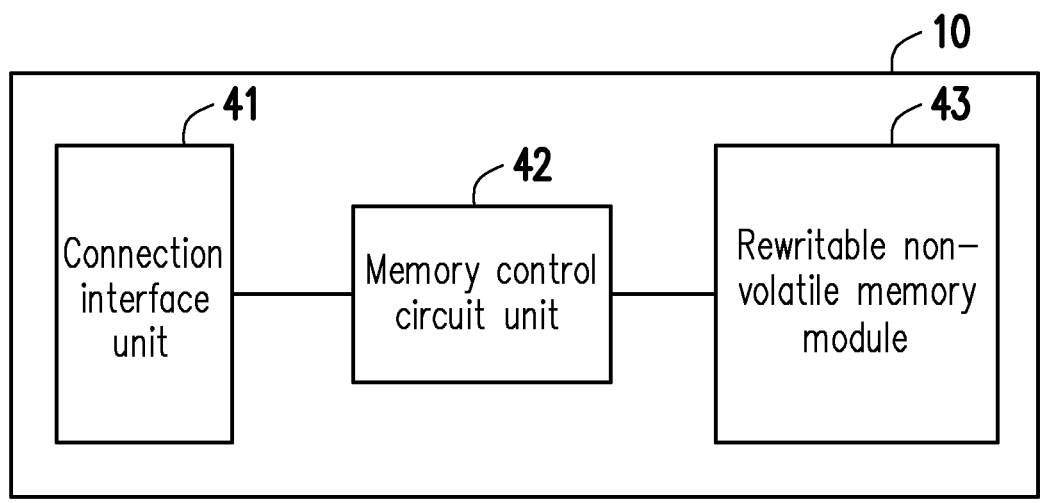
FIG. 4A is a schematic diagram of a memory storage device according to an exemplary embodiment of the disclosure.

FIG. 4A is a schematic diagram of a memory storage device according to an exemplary embodiment of the disclosure. Please refer to FIG. 4A. The memory storage device 10 includes a connection interface unit 41, a memory control circuit unit 42, and a rewritable non-volatile memory module 43.

The connection interface unit 41 is used to couple the memory storage device 10 to the host system 11. The memory storage device 10 may communicate with the host system 11 via the connection interface unit 41. In an exemplary embodiment, the connection interface unit 41 is compatible with the peripheral component interconnect express (PCI express) standard. In an exemplary embodiment, the connection interface unit 41 may also conform to the serial advanced technology attachment (SATA) standard, the parallel advanced technology attachment (PATA) standard, the Institute of Electrical and Electronic Engineers (IEEE) 1394 standard, the universal serial bus (USB) standard, the SD interface standard, the ultra high speed-I (UHS-I) interface standard, the ultra high speed-II (UHS-II) interface standard, the memory stick (MS) interface standard, the multi chip package (MCP) interface standard, the multi media card (MMC) interface standard, the eMMC interface standard, the universal flash storage (UFS) interface standard, the eMCP interface standard, the CF interface standard, the integrated device electronics (IDE) standard, or other suitable standards. The connection interface unit 41 and the memory control circuit unit 42 may be packaged in one chip, or the connection interface unit 41 may be arranged outside a chip containing the memory control circuit unit 42.

The memory control circuit unit 42 is coupled to the connection interface unit 41 and the rewritable non-volatile memory module 43. The memory control circuit unit 42 is used to execute multiple logic gates or control commands implemented in the form of hardware or the form of firmware and perform operations such as data writing, reading, and erasing in the rewritable non-volatile memory module 43 according to a command of the host system 11.

The rewritable non-volatile memory module 43 is used to store data written by the host system 11. The rewritable non-volatile memory module 43 may include a single level cell (SLC) NAND flash memory module (that is, a flash memory module that may store 1 bit in one memory cell), a multi level cell (MLC) NAND flash memory module (that is, a flash memory module that may store 2 bits in one memory cell), a triple level cell (TLC) NAND flash memory module (that is, a flash memory module that may store 3 bits in one memory cell), a quad level cell (QLC) NAND flash memory module (that is, a flash memory module that may store 4 bits in one memory cell), other flash memory modules, or other memory modules with the same characteristics.

Each memory cell in the rewritable non-volatile memory module 43 stores one or more bits with changes in voltage (hereinafter also referred to as a threshold voltage). Specifically, there is a charge trapping layer between a control gate and a channel of each memory cell. Through applying a write voltage to the control gate, the number of electrons in the charge trapping layer may be changed, thereby changing the threshold voltage of the memory cell. The operation of changing the threshold voltage of the memory cell is also referred to as "writing data to the memory cell" or "programming the memory cell". As the threshold voltage changes, each memory cell in the rewritable non-volatile memory module 43 has multiple storage statuses. Through applying a read voltage, it is possible to judge which storage status a memory cell belongs to, thereby obtaining one or more bits stored in the memory cell.

In an exemplary embodiment, the memory cells of the rewritable non-volatile memory module 43 may constitute multiple physical programming units, and the physical programming units may constitute multiple physical erasing units. Specifically, the memory cells on the same word line may form one or more physical programming units. If each memory cell may store more than 2 bits, the physical programming units on the same word line may be at least classified into a lower physical programming unit and an upper physical programming unit. For example, a least significant bit (LSB) of a memory cell belongs to the lower physical programming unit, and a most significant bit (MSB) of a memory cell belongs to the upper physical programming unit. Generally speaking, in the MLC NAND flash memory, the write speed of the lower physical programming unit is greater than the write speed of the upper physical programming unit and/or the reliability of the lower physical programming unit is higher than the reliability of the upper physical programming unit.

In an exemplary embodiment, the physical programming unit is the smallest unit of programming. That is, the physical programming unit is the smallest unit of writing data. For example, the physical programming unit may be a physical page or a physical sector. If the physical programming unit is a physical page, the physical programming units may include a data bit area and a redundancy bit area. The data bit area contains multiple physical sectors for storing user data, and the redundancy bit area is used to store system data (for example, management data such as an error correcting code). In an exemplary embodiment, the data bit area contains 32 physical sectors, and the size of one physical sector is 512 bytes (B). However, in other exemplary embodiments, the data bit area may also contain 8, 16, more, or less physical sectors, and the size of each physical sector may also be greater or smaller. On the other hand, the physical erasing unit is the smallest unit of erasure. That is, each physical erasing unit contains the smallest number of memory cells to be erased together. For example, the physical erasing unit is a physical block.

Figure 4B:
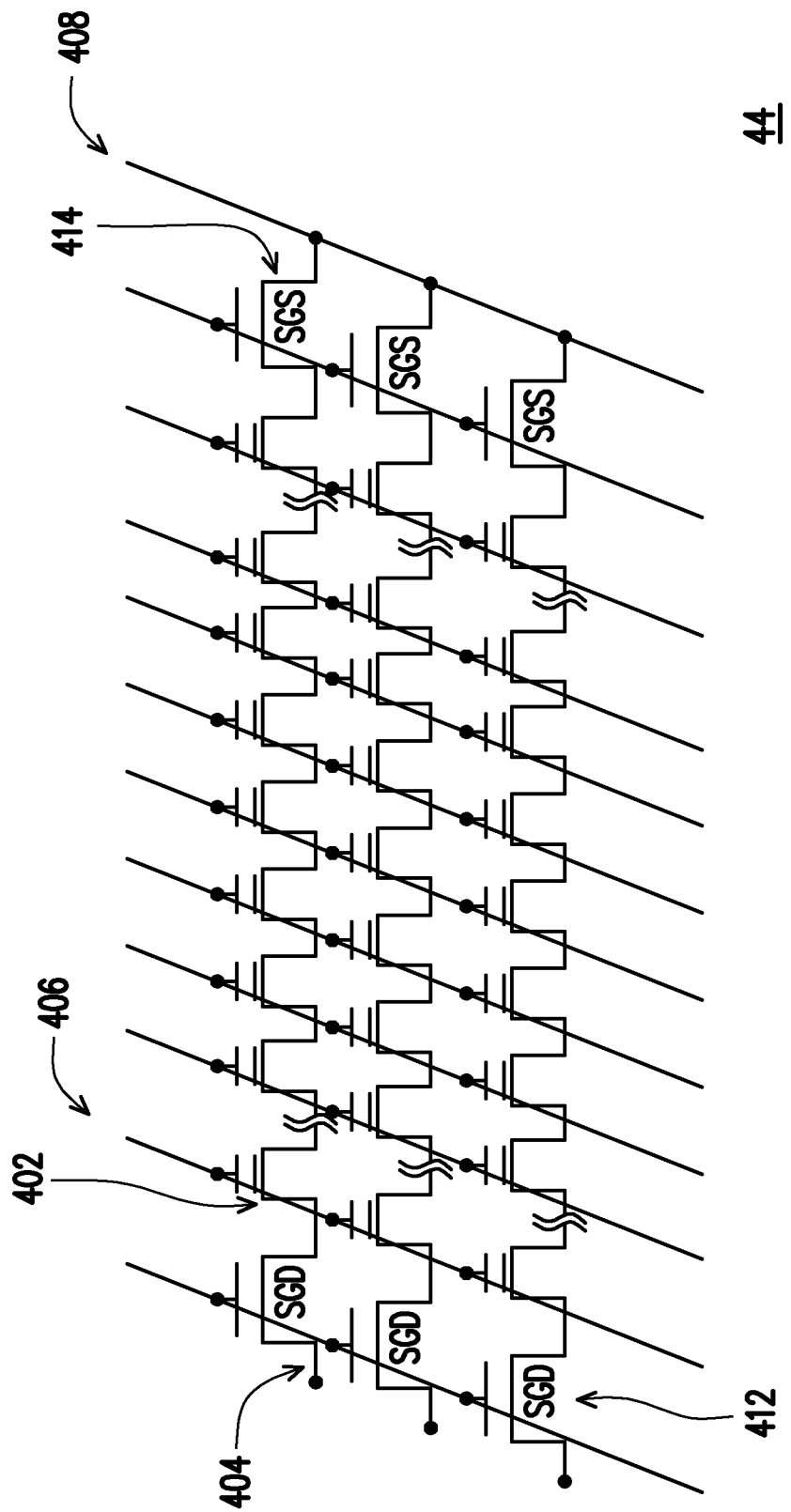
FIG. 4B is a schematic diagram of a memory cell array according to an exemplary embodiment of the disclosure.

FIG. 4B is a schematic diagram of a memory cell array according to an exemplary embodiment of the disclosure. Please refer to FIG. 4B. A memory cell array 44 includes multiple memory cells 402 for storing data, multiple select gate drain (SGD) transistors 412, and multiple select gate source (SGS) transistors 414, multiple bit lines 404 connecting the memory cells 402, multiple word lines 406, and a common source line 408. In particular, the memory cells 402 are configured on intersections of the bit lines 404 and the word lines 406 in an array, as shown in FIG. 4B. In addition, the rewritable non-volatile memory module 43 may include multiple memory cell arrays 44. The memory cell arrays 44 may be horizontally and/or vertically stacked.

Figure 5:
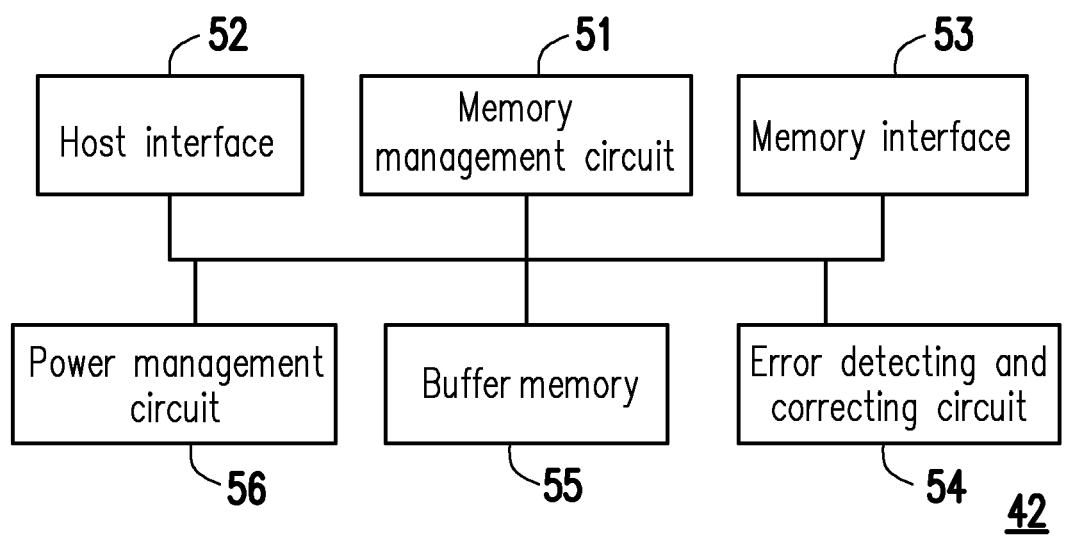
FIG. 5 is a schematic diagram of a memory control circuit unit according to an exemplary embodiment of the disclosure.

FIG. 5 is a schematic diagram of a memory control circuit unit according to an exemplary embodiment of the disclosure. Please refer to FIG. 5. The memory control circuit unit 42 includes a memory management circuit 51, a host interface 52, and a memory interface 53.

The memory management circuit 51 is used to control the overall operation of the memory control circuit unit 42. Specifically, the memory management circuit 51 has multiple control commands, and when the memory storage device 10 is operating, the control commands are executed to perform operations such as data writing, reading, and erasing. The following description of the operation of the memory management circuit 51 is equivalent to the description of the operation of the memory control circuit unit 42.

In an exemplary embodiment, the control commands of the memory management circuit 51 are implemented in the form of firmware. For example, the memory management circuit 51 has a microprocessor unit (not shown) and a read only memory (not shown), and the control commands are burnt into the read only memory. When the memory storage device 10 is operating, the control commands are executed by the microprocessor unit to perform operations such as data writing, reading, and erasing.

In an exemplary embodiment, the control commands of the memory management circuit 51 may also be stored in a specific area (for example, a system area dedicated to storing system data in a memory module) of the rewritable non-volatile memory module 43 in the form of program codes. In addition, the memory management circuit 51 has a microprocessor unit (not shown), a read only memory (not shown), and a random access memory (not shown). In particular, the read only memory has a boot code, and when the memory control circuit unit 42 is enabled, the microprocessor unit first executes the boot code to load the control commands stored in the rewritable non-volatile memory module 43 into the random access memory of the memory management circuit 51. After that, the microprocessor unit runs the control commands to perform operations such as data writing, reading, and erasing.

In an exemplary embodiment, the control commands of the memory management circuit 51 may also be implemented in the form of hardware. For example, the memory management circuit 51 includes a microcontroller, a memory cell management circuit, a memory write circuit, a memory read circuit, a memory erase circuit, and a data processing circuit. The memory cell management circuit, the memory write circuit, the memory read circuit, the memory erase circuit, and the data processing circuit are coupled to the microcontroller. The memory cell management circuit is used to manage a memory cell or a memory cell group of the rewritable non-volatile memory module 43. The memory write circuit is used to issue a write command sequence to the rewritable non-volatile memory module 43 to write data to the rewritable non-volatile memory module 43. The memory read circuit is used to issue a read command sequence to the rewritable non-volatile memory module 43 to read data from the rewritable non-volatile memory module 43. The memory erase circuit is used to issue an erase command sequence to the rewritable non-volatile memory module 43 to erase data from the rewritable non-volatile memory module 43. The data processing circuit is used to process data to be written to the rewritable non-volatile memory module 43 and data read from the rewritable non-volatile memory module 43. The write command sequence, the read command sequence, and the erase command sequence may each include one or more program codes or command codes and are used to instruct the rewritable non-volatile memory module 43 to execute corresponding operations such as writing, reading, and erasing. In an exemplary embodiment, the memory management circuit 51 may also issue other types of command sequences to the rewritable non-volatile memory module 43 to instruct to execute corresponding operations.

The host interface 52 is coupled to the memory management circuit 51. The memory management circuit 51 may communicate with the host system 11 through the host interface 52. The host interface 52 may be used to receive and identify commands and data sent by the host system 11. For example, the commands and the data sent by the host system 11 may be sent to the memory management circuit 51 through the host interface 52. In addition, the memory management circuit 51 may send the data to the host system 11 through the host interface 52. In the exemplary embodiment, the host interface 52 is compatible with the PCI express standard. However, it must be understood that the disclosure is not limited thereto. The host interface 52 may also be compatible with the SATA standard, the PATA standard, the IEEE 1394 standard, the USB standard, the SD standard, the UHS-I standard, the UHS-II standard, the MS standard, the MMC standard, the eMMC standard, the UFS standard, the CF standard, the IDE standard, or other suitable data transmission standards.

The memory interface 53 is coupled to the memory management circuit 51 and is used to access the rewritable non-volatile memory module 43. For example, the memory management circuit 51 may access the rewritable non-volatile memory module 43 through the memory interface 53. In other words, data to be written to the rewritable non-volatile memory module 43 is converted into a format acceptable by the rewritable non-volatile memory module 43 via the memory interface 53. Specifically, if the memory management circuit 51 intends to access the rewritable non-volatile memory module 43, the memory interface 53 will send the corresponding command sequence. For example, the command sequences may include the write command sequence instructing to write data, the read command sequence instructing to read data, the erase command sequence instructing to erase data, and corresponding command sequences instructing various memory operations (for example, changing a read voltage level, executing a garbage collection operation, etc.). The command sequences are, for example, generated by the memory management circuit 51 and sent to the rewritable non-volatile memory module 43 through the memory interface 53. The command sequences may include one or more signals, or data on a bus. The signals or the data may include command codes or program codes. For example, the read command sequence includes information such as a read recognition code and a memory address.

In an exemplary embodiment, the memory control circuit unit 42 further includes an error detecting and correcting circuit 54, a buffer memory 55, and a power management circuit 56.

The error detecting and correcting circuit 54 is coupled to the memory management circuit 51 and is used to execute error detecting and correcting operations to ensure correctness of data. Specifically, when the memory management circuit 51 receives a write command from the host system 11, the error detecting and correcting circuit 54 generates a corresponding error correcting code (ECC) and/or error detecting code (EDC) for data corresponding to the write command, and the memory management circuit 51 writes the data corresponding to the write command and the corresponding error correcting code and/or error detecting code to the rewritable non-volatile memory module 43. Later, when the memory management circuit 51 reads the data from the rewritable non-volatile memory module 43, the error correcting code and/or the error detecting code corresponding to the data will also be read, and the error detecting and correcting circuit 54 will execute the error detecting and correcting operations on the read data according to the error correcting code and/or the error detecting code.

The buffer memory 55 is coupled to the memory management circuit 51 and is used to temporarily store data. The power management circuit 56 is coupled to the memory management circuit 51 and is used to control the power of the memory storage device 10.

In an exemplary embodiment, the rewritable non-volatile memory module 43 of FIG. 4 may include a flash memory module. In an exemplary embodiment, the memory control circuit unit 42 of FIG. 4 may include a flash memory controller. In an exemplary embodiment, the memory management circuit 51 of FIG. 5 may include a flash memory management circuit.

Figure 6:
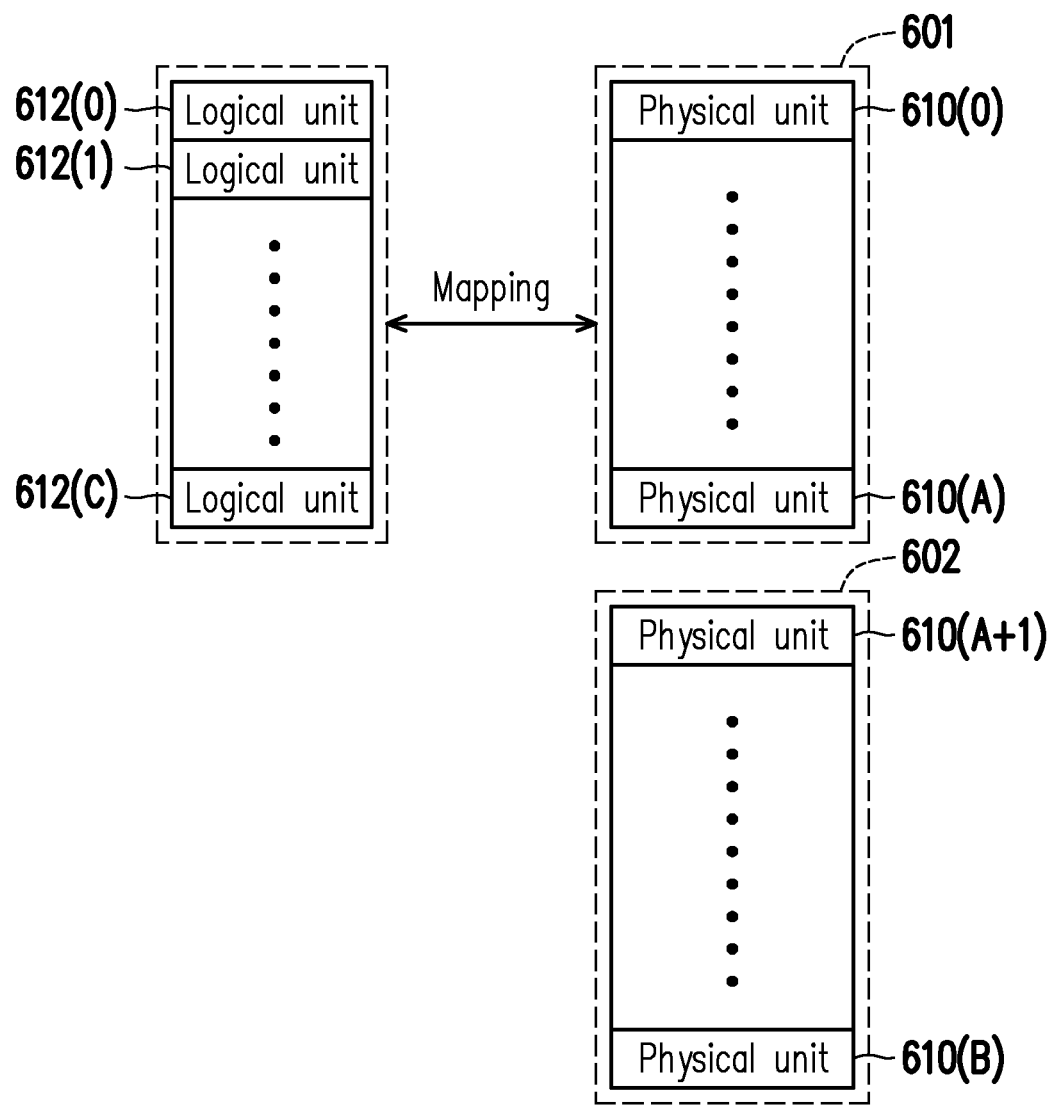
FIG. 6 is a schematic diagram of managing a rewritable non-volatile memory module according to an exemplary embodiment of the disclosure.

FIG. 6 is a schematic diagram of managing a rewritable non-volatile memory module according to an exemplary embodiment of the disclosure. Please refer to FIG. 6. The memory management circuit 51 may logically group physical units 610(0) to 610(B) in the rewritable non-volatile memory module 43 into a storage area 601 and a spare area 602.

In an exemplary embodiment, a physical unit refers to a physical address or a physical programming unit. In an exemplary embodiment, a physical unit may also be composed of multiple continuous or discontinuous physical addresses. In an exemplary embodiment, a physical unit may also refer to a virtual block (VB). One virtual block may include multiple physical addresses or multiple physical programming units.

The physical units 610(0) to 610(A) in the storage area 601 are used to store the user data (for example, the user data from the host system 11 of FIG. 1). For example, the physical units 610(0) to 610(A) in the storage area 601 may store valid data and invalid data. The physical units 610(A+1) to 610(B) in the spare area 602 do not store data (for example, valid data). For example, if a certain physical unit does not store valid data, the physical unit may be associated (or added) to the spare area 602. In addition, the physical units (or the physical units that do not store valid data) in the spare area 602 may be erased. When writing new data, one or more physical units may be extracted from the spare area 602 to store the new data. In an exemplary embodiment, the spare area 602 is also referred to as a free pool.

The memory management circuit 51 may be configured with logical units 612(0) to 612(C) to map the physical units 610(0) to 610(A) in the storage area 601. In an exemplary embodiment, each logical unit corresponds to one logical address. For example, one logical address may include one or more logical block addresses (LBA) or other logical management units. In an exemplary embodiment, one logical unit may also correspond to one logical programming unit or be composed of multiple continuous or discontinuous logical addresses.

It should be noted that one logical unit may be mapped to one or more physical units. If a certain physical unit is currently mapped by a certain logical unit, it means that data currently stored in the physical unit includes valid data. Conversely, if a certain physical unit is not currently mapped by any logical unit, it means that data currently stored in the physical unit does not include any valid data.

The memory management circuit 51 may record management data (also referred to as logical-to-physical mapping information) describing a mapping relationship between the logical unit and the physical unit in at least one logical-to-physical mapping table. When the host system 11 intends to read data from the memory storage device 10 or write data to the memory storage device 10, the memory management circuit 51 may access the rewritable non-volatile memory module 43 according to information in the logical-to-physical mapping table.

The memory management circuit 51 may receive a write command from the host system 11 of FIG. 1. The memory management circuit 51 may send the write command sequence to the rewritable non-volatile memory module 43 according to the write command to instruct the rewritable non-volatile memory module 43 to program a specific physical programming unit (that is, write data to the specific physical programming unit). In particular, a physical programming unit that has not been programmed may be in an erased status. A programmed physical programmed unit (and memory cell) may be changed into a programmed status. The physical programming unit in the programmed status may be changed back to the erased status after being erased.

The memory management circuit 51 may receive a read command from the host system 11 of FIG. 1. The read command may instruct to read a specific logical unit (also referred to as a first logical unit). For example, the first logical unit may contain at least one of the logical units 612(0) to 612(C) of FIG. 6. The first logical unit may be mapped to a specific physical programming unit (also referred to as a first physical programming unit) in the rewritable non-volatile memory module 43. In particular, the first physical programming unit may be contained in the specific physical erasing unit (also referred to as the first physical erasing unit) in the rewritable non-volatile memory module 43. According to the read command, the memory management circuit 51 may obtain the type of the first physical erasing unit.

It should be noted that different types of physical erasing units may contain different numbers of physical programming units in the erased status (or the programmed status). For example, in an exemplary embodiment, the total number (also referred to as a first total number) of physical programming units in the erased status in a first type physical unit may be different from the total number (also referred to as a second total number) of physical programming units in the erased status in a second type physical unit. For example, the first total number may be greater than the second total number.

In an exemplary embodiment, the first total number is not zero, and the second total number is zero. That is, in an exemplary embodiment, the first type physical unit refers to a physical erasing unit that contains at least one physical programming unit in the erased status, and the second type physical unit refers to a physical erasing unit that does not contain any physical programming unit in the erased status. For example, assuming that the first physical erasing unit contains at least one physical programming unit in the erased status, the first physical erasing unit may be determined or identified as the first type physical unit. Alternatively, assuming that the first physical erasing unit does not contain any physical programming unit in the erased status (that is, all the physical programming units in the first physical erasing unit are in the programmed status), the first physical erasing unit may be determined or identified as the second type physical unit.

In an exemplary embodiment, the memory management circuit 51 may judge whether the first physical erasing unit is the first type physical unit or the second type physical unit according to the total number of physical programming units in the erased status in the first physical erasing unit. For example, in response to the total number of physical programming units in the erased status in the first physical erasing unit not being zero, the memory management circuit 51 may judge that the first physical erasing unit is the first type physical unit. Alternatively, in response to the total number of physical programming units in the erased status in the first physical erasing unit being zero, the first physical erasing unit is judged as the second type physical unit.

In an exemplary embodiment, the first type physical unit refers to a physical erasing unit that is currently used as an open unit (also referred to as an open block). For example, the physical erasing unit as the open unit is the physical erasing unit currently used to store data. Once a certain physical erasing unit as the open unit is fully written (for example, all the physical programming units in the physical erasing unit have been programmed and are in the programmed status), the physical erasing unit may become a closed unit (also referred to as a closed block). In an exemplary embodiment, the second type physical unit refers to a physical erasing unit that is currently a closed unit.

In an exemplary embodiment, the memory management circuit 51 may judge whether the first physical erasing unit is the first type physical unit or the second type physical unit according to whether the first physical erasing unit is the open unit. For example, in response to the first physical erasing unit being the open unit, the memory management circuit 51 may judge that the first physical erasing unit is the first type physical unit. Alternatively, in response to the first physical erasing unit not being the open unit (for example, being the closed unit), the memory management circuit 51 may judge that the first physical erasing unit is the second type physical unit.

After obtaining the type of the first physical erasing unit, the memory management circuit 51 may send an operation command sequence according to the type of the first physical erasing unit. The operation command sequence may be used to instruct the rewritable non-volatile memory module 43 to read the first physical programming unit based on a specific electronic configuration.

In an exemplary embodiment, in response to the first physical erasing unit being the first type physical unit, the memory management circuit 51 may send a specific operation command sequence (also referred to as a first operation command sequence) to the rewritable non-volatile memory module 43. The first operation command sequence may be used to instruct the rewritable non-volatile memory module 43 to read the first physical programming unit based on a specific electronic configuration (also referred to as a first electronic configuration). For example, according to the first operation command sequence, the rewritable non-volatile memory module 43 may use an electronic parameter (also referred to as a first electronic parameter) corresponding to the first electronic configuration to read data from the first physical programming unit. For example, the first electronic parameter may affect a voltage, a current, and/or an impedance applied to the first physical erasing unit (and/or the first physical programming unit) during a period of reading the data from the first physical programming unit.

In an exemplary embodiment, in response to the first physical erasing unit being the second type physical unit, the memory management circuit 51 may send a specific operation command sequence (also referred to as a second operation command sequence) to the rewritable non-volatile memory module 43. The second operation command sequence may be used to instruct the rewritable non-volatile memory module 43 to read the first physical programming unit based on a specific electronic configuration (also referred to as a second electronic configuration). The first electronic configuration is different from the second electronic configuration. For example, according to the second operation command sequence, the rewritable non-volatile memory module 43 may use an electronic parameter (also referred to as a second electronic parameter) corresponding to the second electronic configuration to read data from the first physical programming unit. Similar to the first electronic parameter, the second electronic parameter may also affect a voltage, a current, and/or an impedance applied to the first physical erasing unit (and/or the first physical programming unit) during a period of reading the data from the first physical programming unit. However, the first electronic parameter is different from the second electronic parameter. In this way, when reading data from different types of physical erasing units, different voltages, currents, and/or impedances may be applied to the physical erasing units to improve accuracy of reading data.

Figure 7:
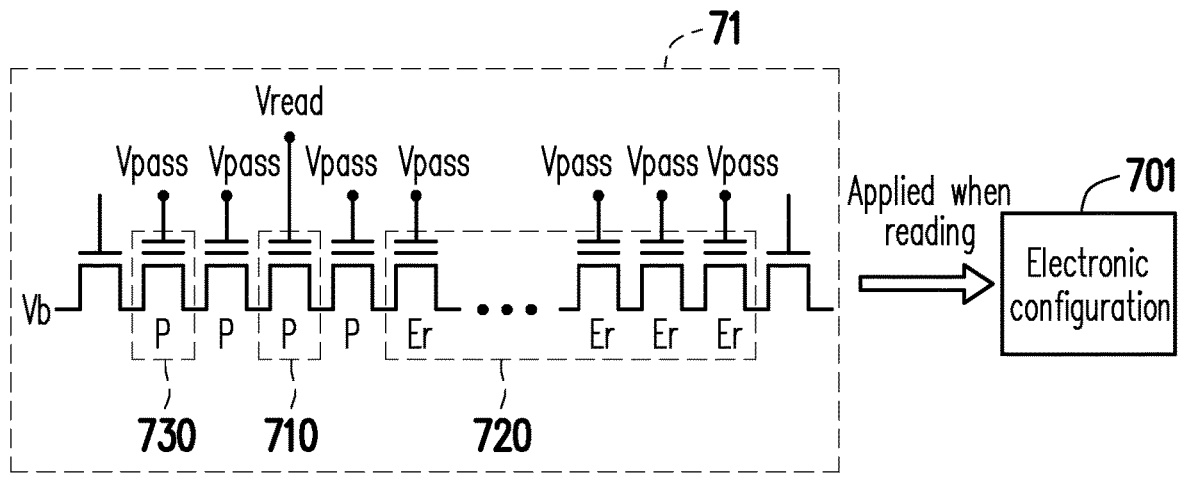
FIG. 7 is a schematic diagram of adopting specific electronic configurations to read data according to different types of physical erasing units according to an exemplary embodiment of the disclosure.
Figure 7:
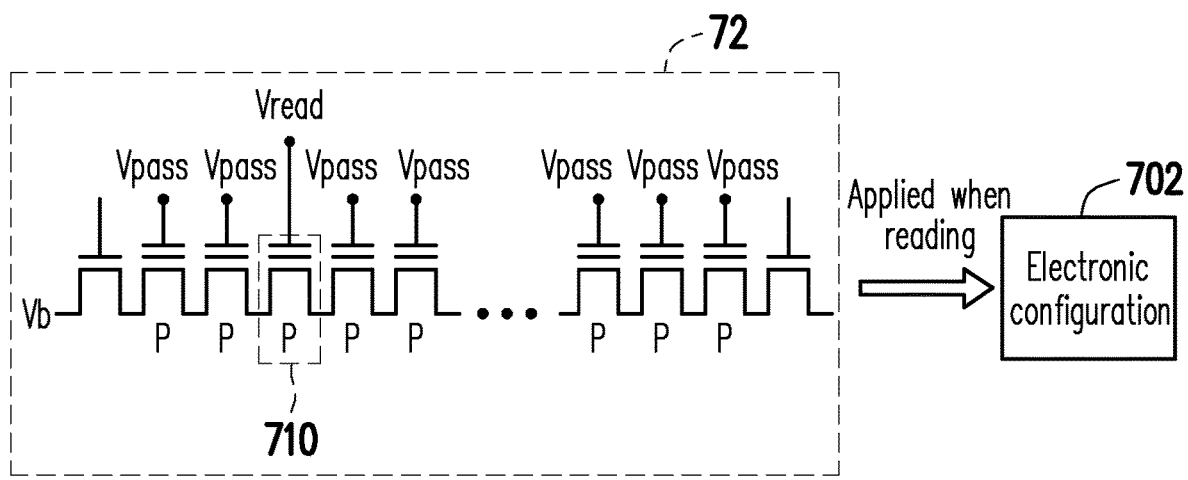

FIG. 7 is a schematic diagram of adopting specific electronic configurations to read data according to different types of physical erasing units according to an exemplary embodiment of the disclosure. Please refer to FIG. 7. A first type physical erasing unit 71 may contain at least one physical programming unit in a programmed status (labelled as P) and at least one physical programming unit in an erased status (labelled as Er). Multiple memory cells in each physical programming unit may be serially connected to each other via the word line 406 of FIG. 4B. For example, the word line 406 may be coupled to control gates of the memory cells. A second type physical erasing unit 72 may contain multiple physical programming units in the programmed status (labelled as P), but does not contain any physical programming unit in the erased status (labelled as Er).

It should be noted that the first type physical erasing unit 71 and the second type physical erasing unit 72 shown in FIG. 7 are only examples. The disclosure does not limit the distribution status of the different types of physical programming units (that is, in the programmed status and/or in the erased status) in the first type physical erasing unit 71 and/or the second type physical erasing unit 72. For example, in another exemplary embodiment, the second type physical erasing unit 72 may also contain at least one physical programming unit in the erased status, as long as the total number of physical programming units in the erased status in the second type physical erasing unit 72 is different from the total number of physical programming units in the erased status in the first type physical erasing unit 71.

In an exemplary embodiment, the first physical erasing unit belongs to the first type physical erasing unit 71. Therefore, the memory management circuit 51 may send the first operation command sequence to instruct the rewritable non-volatile memory module 43 to apply an electronic configuration (that is, the first electronic configuration) 701 to read the first physical programming unit. In an exemplary embodiment, compared to an electronic configuration (that is, the second electronic configuration) 702, in a case where the first physical erasing unit belongs to the first type physical erasing unit 71, reading the first physical programming unit based on the electronic configuration 701 may reduce the total number of error bits read from the first physical programming unit.

In an exemplary embodiment, the first physical erasing unit belongs to the second type physical erasing unit 72. Therefore, the memory management circuit 51 may send the second operation command sequence to instruct the rewritable non-volatile memory module 43 to apply the electronic configuration 702 to read the first physical programming unit. In an exemplary embodiment, compared with the electronic configuration 701, in a case where the first physical erasing unit belongs to the second type physical erasing unit 72, reading the first physical programming unit based on the electronic configuration 702 may reduce the total number of error bits read from the first physical programming unit.

In an exemplary embodiment, the first operation command sequence may instruct the rewritable non-volatile memory module 43 to use a specific read voltage level (also referred to as a first read voltage level) to read the first physical programming unit. In an exemplary embodiment, the second operation command sequence may instruct the rewritable non-volatile memory module 43 to use a specific read voltage level (also referred to as a second read voltage level) to read the first physical programming unit. The first read voltage level is different from the second read voltage level.

In an exemplary embodiment, the electronic configuration 701 is a customized electronic configuration, which is different from a preset electronic configuration adopted by the rewritable non-volatile memory module 43. For example, the memory management circuit 51 may determine or adjust the electronic configuration 701 according to the distribution of the physical programming units in the programmed status (and/or the erased status) in the first physical erasing unit. Depending on the distribution of the physical programming units in the programmed status (and/or the erased status) in the first physical erasing unit, the adopted electronic configuration 701 may be different. In addition, the electronic configuration 702 may be the preset electronic configuration adopted by the rewritable non-volatile memory module 43.

In an exemplary embodiment, in the case where the first physical erasing unit belongs to the first type physical erasing unit 71, the memory management circuit 51 may determine the first read voltage level according to the distribution of the physical programming units in the programmed status (and/or the erased status) in the first physical erasing unit. For example, the first read voltage level may be a customized read voltage level, which is different from a preset read voltage level for reading the first physical programming unit. The memory management circuit 51 may send the first operation command sequence according to the determined first read voltage level. For example, according to the first operation command sequence, the rewritable non-volatile memory module 43 may set a read voltage level Vread in FIG. 7 to the first read voltage level and use the first read voltage level to read a physical programming unit 710 (that is, the first physical programming unit).

In an exemplary embodiment, the distribution of the physical programming units in the programmed status (and/or the erased status) in the first physical erasing unit may reflect the total number of physical programming units in the programmed status and/or the erased status in the first physical erasing unit. The memory management circuit 51 may determine (containing adjust) the first read voltage level (for example, the read voltage level Vread in FIG. 7) according to the total number. For example, depending on the total number of physical programming units in the programmed status in the first physical erasing unit, the memory management circuit 51 may determine different first read voltage levels.

In an exemplary embodiment, after determining the first read voltage level (for example, the read voltage level Vread in FIG. 7), the memory management circuit 51 may determine a read voltage level for reading a remaining physical programming unit (for example, a physical programming unit 730) in the first physical erasing unit according to the determined first read voltage level. For example, the physical programming unit 730 may include any one of the first physical erasing units in the programmed status. For example, the memory management circuit 51 may input a voltage value of the first read voltage level to a specific algorithm or table to obtain a voltage value for reading the read voltage level of the physical programming unit 730. Thereafter, the memory management circuit 51 may read the physical programming unit 730 according to a newly determined read voltage level. For example, compared to the preset read voltage level for reading the physical programming unit 730, using the new read voltage level to read the physical programming unit 730 helps reduce the total number of error bits read from the physical programming unit 730. In an exemplary embodiment, the physical programming unit 730 may also include multiple physical programming units belonging to different physical erasing units, different planes (also referred to as memory planes), or different chip enable (CE) areas.

In an exemplary embodiment, in the case where the first physical erasing unit belongs to the second type physical erasing unit 72, the rewritable non-volatile memory module 43 may use another read voltage level (that is, the second read voltage level) to read the first physical programming unit according to the electronic configuration 702. The second read voltage level may be the preset read voltage level for reading the first physical programming unit. For example, according to the second operation command sequence, the rewritable non-volatile memory module 43 may set the read voltage level Vread in FIG. 7 to the second read voltage level and use the second read voltage level to read the physical programming unit 710.

In an exemplary embodiment, the first operation command sequence may instruct the rewritable non-volatile memory module 43 to adjust a turn-on voltage applied to at least part of the physical programming units (that is, a second physical programming unit) in the first physical erasing unit. It should be noted that the second physical programming unit is not in the programmed status. For example, the second physical programming unit may contain at least part of the physical programming units in the erased status in the first physical erasing unit.

Taking FIG. 7 as an example, in the case where the first physical erasing unit belongs to the first type physical erasing unit 71, during a period of using the read voltage level Vread to read the physical programming unit 710, according to the first operation command sequence, the rewriting non-volatile memory module 43 may adjust a turn-on voltage Vpass applied to the physical programming unit 720 (that is, the second physical programming unit). For example, the turn-on voltage Vpass may be applied to a control gate of each memory cell in the physical programming unit 720. Through adjusting the turn-on voltage Vpass, the impedance of at least part of the memory cells in the physical programming unit 720 may be changed, thereby reducing the total number of error bits read by using the read voltage level Vread to read the physical programming unit 710.

In an exemplary embodiment, the second operation command sequence may not instruct the rewritable non-volatile memory module 43 to adjust the turn-on voltage Vpass applied to the physical programming unit 720. Alternatively, in an exemplary embodiment, the second operation command sequence may also instruct the rewritable non-volatile memory module 43 to adjust the turn-on voltage Vpass applied to the physical programming unit 720 during the period of using the read voltage level Vread to read the physical programming unit 710, but an adjustment range of the turn-on voltage Vpass instructed by the second operation command sequence may be different from the adjustment range of the turn-on voltage Vpass instructed by the first operation command sequence.

In an exemplary embodiment, the first operation command sequence may instruct the rewritable non-volatile memory module 43 to adjust (for example, reduce) a bit line voltage applied to the first physical erasing unit. Taking FIG. 7 as an example, in the case where the first physical erasing unit belongs to the first type physical erasing unit 71, during the period of using the read voltage level Vread to read the physical programming unit 710, according to the first operation command sequence, the rewriting non-volatile memory module 43 may adjust a bit line voltage Vb applied to at least part (or all) of the bit lines (for example, the bit lines 404 of FIG. 4B) in the first physical erasing unit. The bit line may be coupled to at least part (or all) of the physical programming units (or the memory cells) in the first physical erasing unit. Through adjusting the bit line voltage Vb, the total number of error bits read by using the read voltage level Vread to read the physical programming unit 710 may also be reduced.

In an exemplary embodiment, the memory management circuit 51 may determine an adjustment range of the bit line voltage Vb according to the distribution of the physical programming units in the programmed status (and/or the erased status) in the first physical erasing unit. For example, depending on the number of physical programming units in the programmed status (and/or the erased status) in the first physical erasing unit, the adjustment range of the bit line voltage Vb may also be different. For example, a degree of decrease of the bit line voltage Vb may be positively correlated with the total number of physical programming units in the erased status in the first physical erasing unit.

In an exemplary embodiment, the second operation command sequence may not instruct the rewritable non-volatile memory module 43 to adjust the bit line voltage Vb. Alternatively, in an exemplary embodiment, the second operation command sequence may also instruct the rewritable non-volatile memory module 43 to adjust the bit line voltage Vb during the period of using the read voltage level Vread to read the physical programming unit 710. However, the adjustment range of the bit line voltage Vb instructed by the second operation command sequence may be different from the adjustment range of the bit line voltage Vb instructed by the first operation command sequence.

It should be noted that the types and adjustment manners of the electronic parameters corresponding to the electronic configurations 701 and/or 702 in the foregoing exemplary embodiments are only examples and are not intended to limit the disclosure. In an exemplary embodiment, more electronic parameters that may affect the voltage, the current, and/or the impedance of the first physical erasing unit to improve accuracy of reading data from the first physical programming unit may also be adjusted during the period of reading data from the first physical programming unit, which is not limited in the disclosure.

Figure 8:
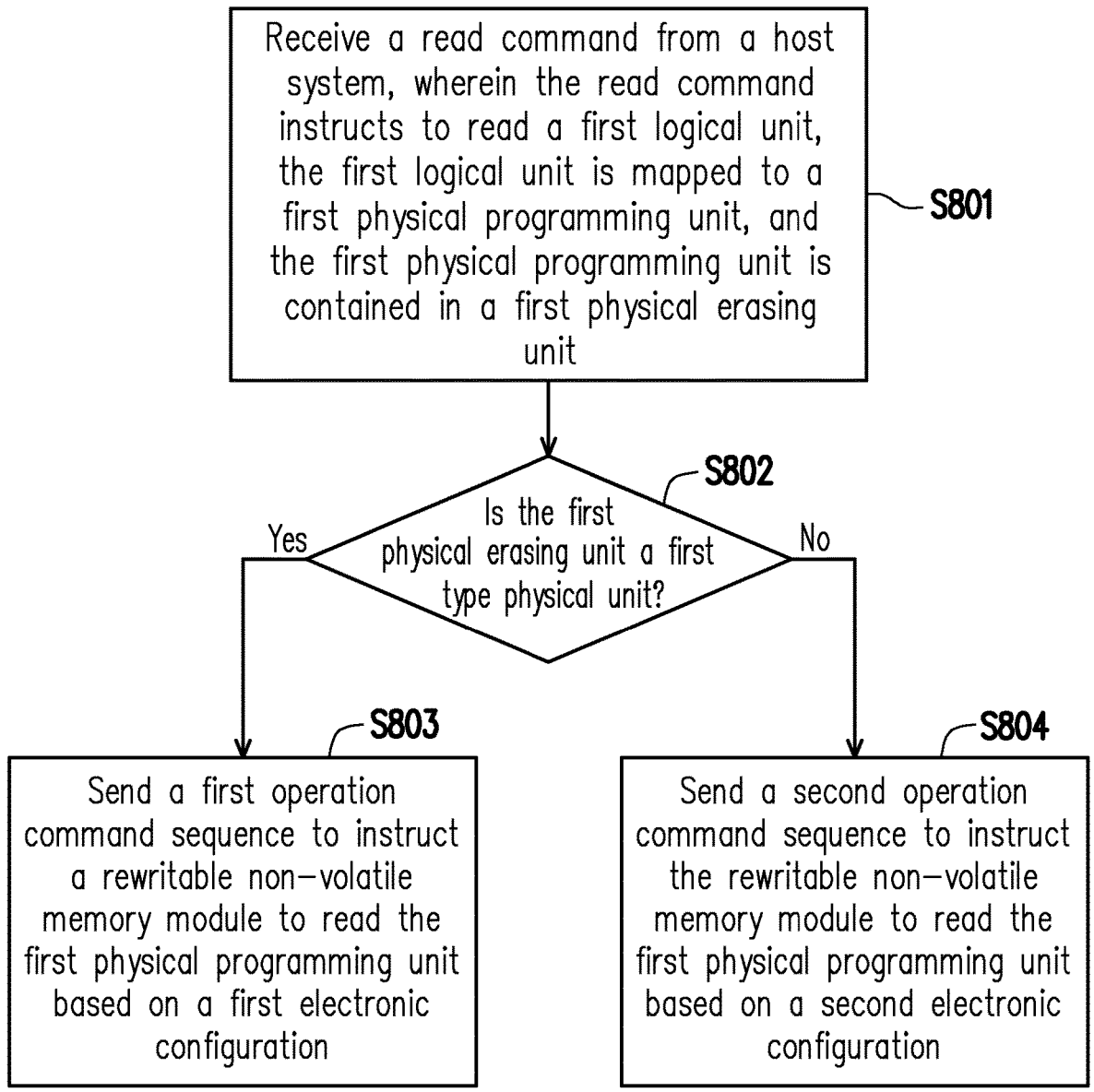
FIG. 8 is a flowchart of a memory control method according to an exemplary embodiment of the disclosure.

FIG. 8 is a flowchart of a memory control method according to an exemplary embodiment of the disclosure. Please refer to FIG. 8, in Step S801, a read command is received from a host system, wherein the read command instructs to read a first logical unit. The first logical unit is mapped to a first physical programming unit, and the first physical programming unit belongs to a first physical erasing unit. In Step S802, whether the first physical erasing unit is a first type physical unit is judged. In response to the first physical erasing unit being the first type physical unit, in Step S803, a first operation command sequence is sent to instruct a rewritable non-volatile memory module to read the first physical programming unit based on a first electronic configuration. Alternatively, in response to the first physical erasing unit being a second type physical unit, in Step S804, a second operation command sequence is sent to instruct the rewritable non-volatile memory module to read the first physical programming unit based on a second electronic configuration. The first electronic configuration is different from the second electronic configuration. The total number of physical programming units in an erased status in the first type physical unit is different from the total number of physical programming units in the erased status in the second type physical unit.

However, each step in FIG. 8 has been described in detail as above and will not be repeated. It is worth noting that each step in FIG. 8 may be implemented as multiple program codes or circuits, which is not limited in the disclosure. In addition, the method of FIG. 8 may be used in conjunction with the foregoing exemplary embodiments or may be used alone, which is not limited in the disclosure.

In summary, in the exemplary embodiments of the disclosure, according to the type of the current physical erasing unit to be read (for example, whether the physical erasing unit belongs to the open unit and/or the distribution of the physical programming units in the erased status in the physical erasing unit), the rewritable non-volatile memory module may be instructed to read the data from the physical erasing unit based on the customized electronic configuration. In this way, accuracy of reading data can be effectively improved.

Although the disclosure has been disclosed in the above embodiments, the embodiments are not intended to limit the disclosure. Persons skilled in the art may make some changes and modifications without departing from the spirit and scope of the disclosure. The protection scope of the disclosure shall be defined by the appended claims.

What is claimed is:

1. A memory control method for a rewritable non-volatile memory module, wherein the rewritable non-volatile memory module comprises a plurality of physical erasing units, the memory control method comprising:
   receiving a read command from a host system, wherein the read command instructs to read a first logical unit, the first logical unit is mapped to a first physical programming unit, and the first physical programming unit belongs to a first physical erasing unit among the physical erasing units;
   in response to the first physical erasing unit being a first type physical unit, sending a first operation command sequence to instruct the rewritable non-volatile memory module to read the first physical programming unit based on a first electronic configuration; and
   in response to the first physical erasing unit being a second type physical unit, sending a second operation command sequence to instruct the rewritable non-volatile memory module to read the first physical programming unit based on a second electronic configuration, wherein
   the first electronic configuration is different from the second electronic configuration, and
   a first total number of physical programming units in an erased status in the first type physical unit is different from a second total number of physical programming units in the erased status in the second type physical unit,
   according to a total number of physical programming units in the erased status in the first physical erasing unit, judging that the first physical erasing unit is the first type physical unit or the second type physical unit.

2. The memory control method according to claim 1, wherein the first total number is not zero, and the second total number is zero.

3. The memory control method according to claim 1, wherein the step of according to the total number of the physical programming units in the erased status in the first physical erasing unit, judging that the first physical erasing unit is the first type physical unit or the second type physical unit comprises:
   in response to the total number of the physical programming units in the erased status in the first physical erasing unit not being zero, judging that the first physical erasing unit is the first type physical unit; and in response to the total number of the physical programming units in the erased status in the first physical erasing unit being zero, judging that the first physical erasing unit is the second type physical unit.

4. The memory control method according to claim 1, wherein the first electronic configuration comprises a first read voltage level, and the first operation command sequence instructs the rewritable non-volatile memory module to use the first read voltage level to read the first physical programming unit, the second electronic configuration comprises a second read voltage level, and the second operation command sequence instructs the rewritable non-volatile memory module to use the second read voltage level to read the first physical programming unit, and the first read voltage level is different from the second read voltage level.

5. The memory control method according to claim 4, further comprising:

according to a distribution of physical programming units in a programmed status in the first physical erasing unit, determining the first read voltage level.

6. The memory control method according to claim 5, further comprising:

according to the first read voltage level, determining a read voltage level for reading a remaining physical programming unit in the first physical erasing unit.

7. The memory control method according to claim 1, wherein the first electronic configuration comprises a turn-on voltage applied to a second physical programming unit in the first physical erasing unit, and the first operation command sequence instructs the rewritable non-volatile memory module to adjust the turn-on voltage, and the second physical programming unit is not in the programmed status.

8. The memory control method according to claim 7, wherein the second physical programming unit comprises a plurality of memory cells, and the turn-on voltage is applied to control gates of the memory cells.

9. The memory control method according to claim 1, wherein the first electronic configuration comprises a bit line voltage applied to the first physical erasing unit, and the first operation command sequence instructs the rewritable non-volatile memory module to adjust the bit line voltage.

10. The memory control method according to claim 9, wherein the first physical erasing unit comprises a plurality of memory cells and at least one word line, the memory cells are coupled to the at least one word line, and the bit line voltage is applied to the at least one word line.

11. A memory storage device, comprising:

a connection interface unit, used to couple to a host system;

a rewritable non-volatile memory module, comprising a plurality of physical erasing units; and a memory control circuit unit, coupled to the connection interface unit and the rewritable non-volatile memory module, wherein the memory control circuit unit is used to:

receive a read command from the host system, wherein the read command instructs to read a first logical unit, the first logical unit is mapped to a first physical programming unit, and the first physical programming unit belongs to a first physical erasing unit among the physical erasing units;

in response to the first physical erasing unit being a first type physical unit, send a first operation command sequence to instruct the rewritable non-volatile memory module to read the first physical programming unit based on a first electronic configuration; and in response to the first physical erasing unit being a second type physical unit, send a second operation command sequence to instruct the rewritable non-volatile memory module to read the first physical programming unit based on a second electronic configuration, wherein the first electronic configuration is different from the second electronic configuration, and a first total number of physical programming units in an erased status in the first type physical unit is different from a second total number of physical programming units in the erased status in the second type physical unit, wherein the memory control circuit unit is further used to:

according to a total number of physical programming units in the erased status in the first physical erasing unit, judge that the first physical erasing unit is the first type physical unit or the second type physical unit.

12. The memory storage device according to claim 11, wherein the first total number is not zero, and the second total number is zero.

13. The memory storage device according to claim 11, wherein the operation of according to the total number of the physical programming units in the erased status in the first physical erasing unit, judging that the first physical erasing unit is the first type physical unit or the second type physical unit comprises:

in response to the total number of the physical programming units in the erased status in the first physical erasing unit not being zero, judging that the first physical erasing unit is the first type physical unit; and in response to the total number of the physical programming units in the erased status in the first physical erasing unit being zero, judging that the first physical erasing unit is the second type physical unit.

14. The memory storage device according to claim 11, wherein the first electronic configuration comprises a first read voltage level, and the first operation command sequence instructs the rewritable non-volatile memory module to use the first read voltage level to read the first physical programming unit, the second electronic configuration comprises a second read voltage level, and the second operation command sequence instructs the rewritable non-volatile memory module to use the second read voltage level to read the first physical programming unit, and the first read voltage level is different from the second read voltage level.

15. The memory storage device according to claim 14, wherein the memory control circuit unit is further used to:

according to a distribution of physical programming units in a programmed status in the first physical erasing unit, determine the first read voltage level.

16. The memory storage device according to claim 15, wherein the memory control circuit unit is further used to:

according to the first read voltage level, determine a read voltage level for reading a remaining physical programming unit in the first physical erasing unit.

17. The memory storage device according to claim 11, wherein the first electronic configuration comprises a turn-on voltage applied to a second physical programming unit in the first physical erasing unit, and the first operation command sequence instructs the rewritable non-volatile memory module to adjust the turn-on voltage, and the second physical programming unit is not in the programmed status.

18. The memory storage device according to claim 17, wherein the second physical programming unit comprises a plurality of memory cells, and the turn-on voltage is applied to control gates of the memory cells.

19. The memory storage device according to claim 11, wherein the first electronic configuration comprises a bit line voltage applied to the first physical erasing unit, and the first operation command sequence instructs the rewritable non-volatile memory module to adjust the bit line voltage.

20. The memory storage device according to claim 19, wherein the first physical erasing unit comprises a plurality of memory cells and at least one word line, the memory cells are coupled to the at least one word line, and the bit line voltage is applied to the at least one word line.

21. A memory control circuit unit for controlling a rewritable non-volatile memory module, wherein the rewritable non-volatile memory module comprises a plurality of physical erasing units, the memory control circuit unit comprising:

a host interface, used to couple to a host system;
a memory interface, used to couple to the rewritable non-volatile memory module; and
a memory management circuit, coupled to the host interface and the memory interface, wherein
the memory management circuit is used to:
 receive a read command from the host system, wherein the read command instructs to read a first logical unit, the first logical unit is mapped to a first physical programming unit, and the first physical programming unit belongs to a first physical erasing unit among the physical erasing units;
 in response to the first physical erasing unit being a first type physical unit, send a first operation command sequence to instruct the rewritable non-volatile memory module to read the first physical programming unit based on a first electronic configuration; and
 in response to the first physical erasing unit being a second type physical unit, send a second operation command sequence to instruct the rewritable non-volatile memory module to read the first physical programming unit based on a second electronic configuration, wherein
 the first electronic configuration is different from the second electronic configuration, and
 a first total number of physical programming units in an erased status in the first type physical unit is different from a second total number of physical programming units in the erased status in the second type physical unit,
  wherein the memory management circuit is further used to:
 according to a total number of physical programming units in the erased status in the first physical erasing unit, judge that the first physical erasing unit is the first type physical unit or the second type physical unit.

22. The memory control circuit unit according to claim 21, wherein the first total number is not zero, and the second total number is zero.

23. The memory control circuit unit according to claim 21, wherein the operation of according to the total number of the physical programming units in the erased status in the first physical erasing unit, judging that the first physical erasing unit is the first type physical unit or the second type physical unit comprises:

in response to the total number of the physical programming units in the erased status in the first physical erasing unit not being zero, judging that the first physical erasing unit is the first type physical unit; and in response to the total number of the physical programming units in the erased status in the first physical erasing unit being zero, judging that the first physical erasing unit is the second type physical unit.

24. The memory control circuit unit according to claim 21, wherein the first electronic configuration comprises a first read voltage level, and the first operation command sequence instructs the rewritable non-volatile memory module to use the first read voltage level to read the first physical programming unit, the second electronic configuration comprises a second read voltage level, and the second operation command sequence instructs the rewritable non-volatile memory module to use the second read voltage level to read the first physical programming unit, and the first read voltage level is different from the second read voltage level.

25. The memory control circuit unit according to claim 24, wherein the memory management circuit is further used to:

according to a distribution of physical programming units in a programmed status in the first physical erasing unit, determine the first read voltage level.

26. The memory control circuit unit according to claim 25, wherein the memory management circuit is further used to:

according to the first read voltage level, determine a read voltage level for reading a remaining physical programming unit in the first physical erasing unit.

27. The memory control circuit unit according to claim 21, wherein the first electronic configuration comprises a turn-on voltage applied to a second physical programming unit in the first physical erasing unit, and the first operation command sequence instructs the rewritable non-volatile memory module to adjust the turn-on voltage, and the second physical programming unit is not in the programmed status.

28. The memory control circuit unit according to claim 27, wherein the second physical programming unit comprises a plurality of memory cells, and the turn-on voltage is applied to control gates of the memory cells.

29. The memory control circuit unit according to claim 21, wherein the first electronic configuration comprises a bit line voltage applied to the first physical erasing unit, and the first operation command sequence instructs the rewritable non-volatile memory module to adjust the bit line voltage.

30. The memory control circuit unit according to claim 29, wherein the first physical erasing unit comprises a plurality of memory cells and at least one word line,
the memory cells are coupled to the at least one word line, and
the bit line voltage is applied to the at least one word line.

* * * * *